United States Patent
Trimmer et al.

(10) Patent No.: US 6,862,656 B2
(45) Date of Patent: Mar. 1, 2005

(54) SYSTEM AND METHOD FOR EXPORTING A VIRTUAL TAPE

(75) Inventors: Don Alvin Trimmer, Livermore, CA (US); Roger Keith Stager, Livermore, CA (US); Craig Anthony Johnston, Livermore, CA (US); Yafen Peggy Chang, Fremont, CA (US); Jerry Kai Lau, Livermore, CA (US); Gavin David Cohen, Dublin, CA (US); Rico Blaser, San Francisco, CA (US)

(73) Assignee: Alacritus, Inc., Pleasanton, CA (US)

( * ) Notice: Subject to any disclaimer, the term of this patent is extended or adjusted under 35 U.S.C. 154(b) by 230 days.

(21) Appl. No.: 10/232,095

(22) Filed: Aug. 30, 2002

(65) Prior Publication Data

US 2004/0044842 A1 Mar. 4, 2004

(51) Int. Cl.[7] .............................................. G06F 12/00
(52) U.S. Cl. ....................................... 711/111; 711/162
(58) Field of Search ......................... 711/111, 117, 161, 711/162; 709/213, 214, 219; 707/2.4

(56) References Cited

U.S. PATENT DOCUMENTS

| | | | |
|---|---|---|---|
| 4,775,969 A | 10/1988 | Osterlund | |
| 5,438,674 A | 8/1995 | Keele et al. | |
| 5,455,926 A | 10/1995 | Keele et al. | |
| 5,666,538 A | 9/1997 | DeNicola | |
| 5,774,292 A | 6/1998 | Georgiou et al. | |
| 5,805,864 A | 9/1998 | Carlson et al. | |
| 5,809,511 A | 9/1998 | Peake | |
| 5,854,720 A | 12/1998 | Shrinkle et al. | |
| 5,961,613 A | 10/1999 | DeNicola | |
| 5,963,971 A | 10/1999 | Fosler et al. | |
| 6,023,709 A | 2/2000 | Anglin et al. | |
| 6,029,179 A | 2/2000 | Kishi | |
| 6,041,329 A | 3/2000 | Kishi | |
| 6,044,442 A | 3/2000 | Jesionowski | |
| 6,049,848 A | 4/2000 | Yates et al. | |
| 6,070,224 A | 5/2000 | LeCrone et al. | |
| 6,098,148 A | 8/2000 | Carlson | |
| 6,128,698 A | 10/2000 | Georgis | |
| 6,131,142 A | 10/2000 | Kamo et al. | |
| 6,173,359 B1 | 1/2001 | Carlson et al. | |
| 6,195,730 B1 | 2/2001 | West | |
| 6,247,096 B1 | 6/2001 | Fisher et al. | |
| 6,260,110 B1 | 7/2001 | LeCrone et al. | |
| 6,269,423 B1 | 7/2001 | Kishi | |
| 6,282,609 B1 | 8/2001 | Carlson | |
| 6,289,425 B1 | 9/2001 | Blendermann et al. | |
| 6,304,880 B1 | 10/2001 | Kishi | |
| 6,317,814 B1 | 11/2001 | Blendermann et al. | |
| 6,324,497 B1 | 11/2001 | Yates et al. | |
| 6,327,418 B1 | 12/2001 | Barton | |
| 6,336,163 B1 | 1/2002 | Brewer et al. | |
| 6,339,778 B1 | 1/2002 | Kishi | |
| 6,341,329 B1 | 1/2002 | LeCrone et al. | |
| 6,343,342 B1 | 1/2002 | Carlson | |
| 6,360,232 B1 | 3/2002 | Brewer et al. | |
| 6,389,503 B1 | 5/2002 | Georgis et al. | |
| 6,557,073 B1 * | 4/2003 | Fujiwara et al. | 711/111 |
| 2003/0014568 A1 * | 1/2003 | Kishi et al. | 710/4 |
| 2003/0120676 A1 * | 6/2003 | Holavanahalli et al. | 707/102 |
| 2003/0182350 A1 * | 9/2003 | Dewey | 709/100 |
| 2004/0044834 A1 * | 3/2004 | Gibble et al. | 711/100 |
| 2004/0044851 A1 * | 3/2004 | Dawson et al. | 711/154 |

* cited by examiner

Primary Examiner—Hiep T. Nguyen
(74) Attorney, Agent, or Firm—Volpe and Koenig P.C.

(57) ABSTRACT

A system and method for exporting a virtual tape from a virtual tape library. The system preferably presents a user with a user interface styled for manipulating a physical tape library. The virtual tape library performs the data storage and retrieval functions. The system includes the user interface having a plurality of user selectable fields styled to interface with the physical tape library. A data storage medium has at least one virtual library and/or virtual tape defined thereon. The data storage medium is capable of storing a plurality of data in the at least one virtual library and/or virtual tape. A physical data storage device is detachably able to be put in communication with the at least one virtual library and/or virtual tape to receive at least a portion of the plurality of data therefrom.

27 Claims, 3 Drawing Sheets

SYSTEM AND METHOD FOR EXPORTING A VIRTUAL TAPE

BACKGROUND

The present invention is directed to a disk based backup storage system that can be seamlessly integrated with a tape backup system or the like and, more specifically, to a system and method of exporting a virtual tape from a virtual library.

Backing up computer data, restoring computer data, securing computer data and managing computer data storage (collectively referred to as data protection) requires complex and disparate technical and operational solutions. Data protection is the single most expensive storage administrative task.

One data protection strategy is to use a redundant array of independent disks (RAID) and disk mirroring technology to protect data. Unfortunately, disk mirroring only prevents data loss in the event of a hardware or power failure. Mirroring does not protect data from human error, such as the accidental deletion of portions of a document. On a disk mirrored system, once data has been deleted from the primary disk, the data is automatically deleted from the mirrored disk and not retrievable.

To address the problem of human error and computer viral damage, backup systems have been designed that are file-based and track files for many generations. One typical form of data protection backup uses physical tapes to store data in tape libraries. Physical tape backup libraries provide the ability to restore current and historical data and to recover from a variety of forms of data loss.

Referring to FIG. 3, a typical physical tape library 12 is shown. Tape cartridge slots 14 provide storage slots for physical tapes 13. This physical tape library has 40 slots 14 with some of the slots 14 shown containing physical tapes 13. Four tape drives 15 are shown along the bottom of the physical tape library 12 that can be used for reading from, and writing to, the physical tapes 13. Barcode labels 17 are typically used with physical tapes 13 to facilitate automated tape handling and tracking by the data protection application. The physical tapes 13 typically also have a human readable version of the information coded in the barcode to allow manual selection and identification of the physical tapes 13.

A typical physical tape library 12 includes a built in barcode reader which is used to read the barcode labels 17 on the physical tapes 13. Typical data protection applications keep track of data that is backed up on tape 13 by associating the data with a tape 13 having a particular barcode. By including in a barcode reader, the physical tape library can identify a particular physical tape 13.

Physical tape libraries 12 preferably include an entry/exit port 19. The entry/exit port 19 (shown in the upper left hand side of FIG. 3) provides a pathway for tapes 13 to be automatically moved into and out of the physical tape library 12. A tape 13 in the entry/exit port can be accessed by a human operator while the rest of the tapes 13 are secured within the physical library housing. Robotic mechanisms are used to move a tape 13 between the slot 14 and the entry/exit port 19.

To automate the mounting and unmounting of tapes into tape backup drives, many organizations use a robotically controlled tape library. Actual usage of individual tape media is generally very infrequent. Backup jobs typically run at night during a period called the "backup window".

Typically, organizations use tape rotation schemes whereby the organization writes to daily tapes, weekly tapes and monthly tapes. Many of the tapes are sent off-site after being written to, and are not accessed again until either computer data must be restored or the computer data on the backup tape has expired (usually after some number of weeks, months or even years). Additionally, adding to the size of a tape library can be a complicated matter requiring the integration of additional tape libraries into the data protection application.

One significant problem with physical tape libraries that are used with mainframe systems, is the unused portion of each physical tape that typically remains after a tape has been used to store data. To overcome this problem, virtual tape libraries have been developed that act as an intermediary between the data generating network and the physical tape library. These virtual libraries are used to accumulate data in virtual tapes until enough data is collected to fill a physical tape by placing more than one virtual tape on a single physical tape. This process is known as stacking. These virtual libraries record the data onto the physical tape libraries using a proprietary format.

Three significant drawbacks with the above described virtual libraries are that when virtual tapes are copied onto physical tapes, because they are written in a proprietary stacked format, they can only be restored by using the proprietary virtual tape system. This introduces a long-term problem because an organization is tied to maintaining the propriety virtual library in order to access their historical data. Additionally, since multiple virtual tapes are stacked onto one physical tape, exporting the physical tape results in removal of multiple virtual tapes, even though the user may have only intended to remove a single virtual tape. Finally, tape stacking makes using a data protection application complicated, since the virtual tape to which the application wrote to different from the resultant physical tape. Therefore, this adds additional steps into the tape management process.

Clearly, what is needed is a data protection system that: handles a virtual tape in an equivalent manner to a physical tape; uses non-proprietary coding and formatting when creating physical tapes; can export a single virtual tape onto a physical data storage device without also copying unselected virtual tapes onto the device; and can be seamlessly integrated with an existing data protection application so that the data tracking algorithms on which operators have been trained, and have developed institutional knowledge, do not need to be changed.

SUMMARY

One embodiment of the present invention is directed to a system for exporting a virtual tape from a virtual tape library that presents a user with a virtual tape graphical user interface having the appearance of a physical tape interface. The virtual tape graphical user interface manipulates a virtual tape library in a manner similar to that used by a physical tape user interface to manipulate a physical tape library. The virtual tape library performs the data storage and retrieval functions requested by the user via the virtual tape graphical user interface so that the physical tape library can be eliminated for primary backup operations. The virtual tape graphical user interface has a plurality of user selectable fields configured to have the appearance of a physical tape user interface. The virtual tape user interface is capable of sending signals in response to manipulation of one of the plurality of user selectable fields.

A controller is in communication with the virtual tape graphical user interface. The controller receives the signals from the virtual tape user interface and/or a pre-existing data protection application. A data storage medium is in communication with the controller. The data storage medium has at least one virtual library and/or virtual tape defined thereon. The data storage medium is capable of storing a plurality of data in the at least one virtual library and/or virtual tape in response to signals received by the controller.

A separate embodiment of the present invention is directed to a method of exporting a virtual tape from a virtual tape library that presents a user with a virtual library graphical user interface having the appearance of an interface for a physical tape library. The virtual tape library performs the data storage and retrieval functions so that the physical tape library can be eliminated for primary backup operations. The method includes: providing the virtual tape library graphical user interface having a plurality of user selectable fields which graphically appear similar to a physical tape library user interface, the virtual tape library user interface sending signals to export virtual media in response to manipulation of one of the plurality of user selectable fields; providing a controller in communication with the virtual tape library graphical user interface and/or a pre-existing data protection application, the controller being capable of receiving the signals from the virtual tape library user graphical interface and is capable of receiving and interpreting commands from the pre-existing data protection application; and copying at least a portion of the plurality of data from at least one virtual tape to a physical data storage device.

A separate embodiment of the present invention is directed to a system for exporting a virtual tape from a virtual tape library that presents a user with a graphical user interface styled for manipulating a virtual tape library in a manner similar to that used to manipulate a physical tape library. The virtual tape library performs the data storage and retrieval functions requested by the user via the graphical user interface so that the physical tape library can be eliminated for primary backup operations. The system includes the graphical user interface having a plurality of user selectable fields styled to interface with the physical tape library. The graphical user interface is capable of sending signals in response to manipulation of one of the plurality of user selectable fields. A controller is in communication with the graphical user interface. The controller receives the signals from the user interface. A data storage medium is in communication with the controller. The data storage medium has at least one virtual library and/or virtual tape defined thereon. The data storage medium is capable of storing a plurality of data in the at least one virtual library and/or virtual tape in response to signals received by the controller. A physical data storage device is in detachable communication with the at least one virtual library and/or virtual tape to receive at least a portion of the plurality of data therefrom.

A separate embodiment of the present invention is directed to a method of exporting a virtual tape from a virtual tape library that presents a user with a graphical user interface styled for manipulating a virtual tape library in a manner similar to that used to manipulate a physical tape library. The virtual tape library performs the data storage and retrieval functions so that the physical tape library can be eliminated for primary backup operations. The method includes: providing a graphical user interface having a plurality of user selectable fields styled like a physical tape library, the graphical user interface sending signals to export virtual media in response to manipulation of one of the plurality of user selectable fields; providing a control mechanism that can trigger the export of virtual media in response to signals from an external backup application; providing a controller in communication with the user interface, the controller receiving the signals from the user interface; providing a data storage medium in communication with the controller, the data storage medium having at least one virtual library defined thereon, each virtual library being capable of having a plurality of virtual tapes defined therein, the data storage medium being capable of storing a plurality of data in the at least one virtual library in response to signals received by the controller; establishing communication between the data storage medium and a physical data storage device; and copying at least a portion of the plurality of data from at least one virtual tape to the physical data storage device.

BRIEF DESCRIPTION OF THE DRAWINGS

The foregoing summary, as well as the following detailed description of preferred embodiment of the invention, will be better understood when read in conjunction with the appended drawings. For the purpose of illustrating the invention, there is shown in the drawings an embodiment which is presently preferred. It is understood, however, that the invention is not limited to the precise arrangement and instrumentality shown. In the drawings.

DETAILED DESCRIPTION OF TIE PREFERRED EMBODIMENT

The term "data storage medium," as used in the claims and in the corresponding portions of the specification, means "all non physical tape data storage means including disks, disk subsystems, hard drives, and future developments in disk data storage and other non-volatile forms of storage." The term "physical data storage device," as used in the claims and in the corresponding portions of the specification, means "a media that is removable such as a disk, tape, optical disk, removable drive or the like." The words "a" and "one," as used in the specification and claims is specifically defined to include one or more of the referenced item unless specifically stated otherwise.

Figure 1:
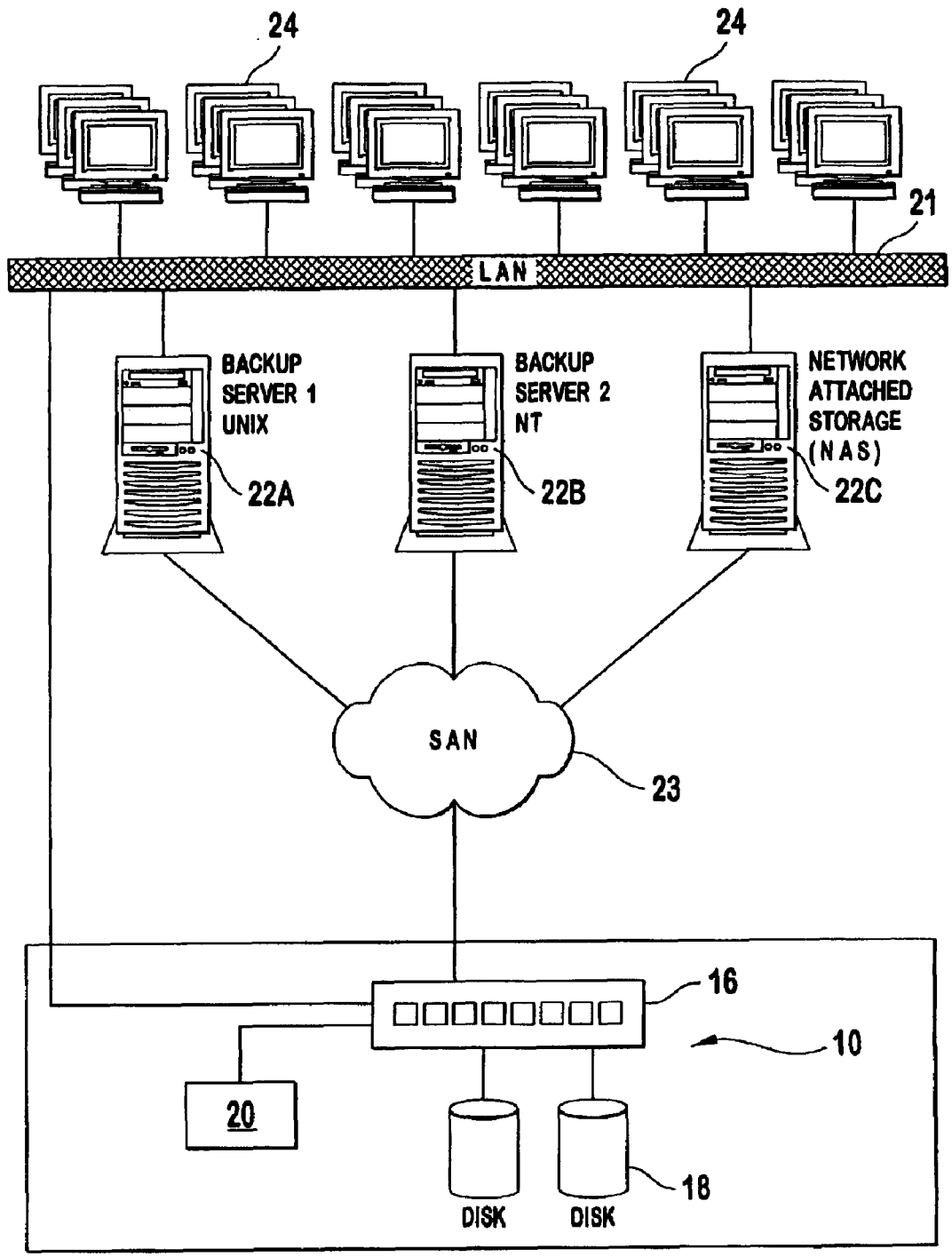
FIG. 1 is a flowchart illustrating the virtual tape export process according to the preferred embodiment of the present invention.

Referring to FIG. 1, a system for exporting a virtual tape is shown and generally designated as 10. Briefly speaking, the system 10 of the present invention is faster, more cost effective, more reliable and easier to manage than conventional tape or virtual tape libraries. The system 10 can export a virtual tape from a virtual tape library. One exemplary network incorporating the system 10 of the present invention includes a local area network 21 that is in communication with three servers 22A–22C which support multiple workstations 24. The servers 22A–22C are also interconnected to a shared storage network (could be local, remote, iSCSI, Fibre Channel, SCSI, etc.) to which the system 10 of the present invention is attached. The system 10 of the present invention preferably incorporates a controller 16, at least one non-tape data storage medium 18, and at least one virtual tape and/or virtual library. As shown in FIG. 1, the system 10 of the present invention preferably entirely replaces physical tape libraries with at least one data storage medium 18 on which at least one virtual tape or virtual library is defined.

Virtual libraries are defined on the data storage medium 18, such as a disk subsystem or the like. The sizing, parameters, and organization of the virtual libraries are preferably set to be generally comparable to physical tape libraries. Each virtual library can contain a plurality of virtual tapes, virtual mailboxes, virtual tape slots and virtual tape drives. The virtual tapes are preferably sized and organized to be generally comparable to physical tapes. In contrast with physical tape backup libraries, multiple virtual libraries can be defined on a single data storage medium 18 that can be simultaneously accessed by multiple servers 22A–22C.

It is preferable that the system 10 of the present invention incorporate non-proprietary (open source) code and formatting to facilitate adapting the system 10 to individual data protection applications. The use of open source in the virtual tape and/or virtual library of the present invention eliminates difficulties created by proprietary formatting when data is being restored years after the data was written into a backup file. Those of ordinary skill in the art will appreciate from this disclosure that the system 10 can incorporate proprietary source code without departing from the scope of the present invention.

The system 10 of the present invention preferably establishes workflows and functions for a virtual tape library that can create a removable physical data storage device 20 without exporting virtual files in addition to those that a user desires to place on the physical data storage device 20. The system 10 can preferably stack multiple virtual tapes in a single virtual library. The system 10 preferably encodes a virtual barcode in each virtual tape that can be used by the data protection application to manage and select various virtual tapes in a manner similar to that used by data protection applications using physical tape libraries. The virtual barcodes are preferably digital data that correspond to the digital data that would be read by a barcode reader that scanned a corresponding actual barcode.

By using virtual barcodes, the system 10 can ensure that physical data storage devices 20 that are created are identical to those physical tapes that the data protection application "thought" it had created when it was writing to the virtual tape and/or virtual tape library. When completing the preparation of the physical data storage device 20, it is preferable that the device 20 includes the data that would have been originally stored on a physical tape, the structure and/or formatting that would have been used on the physical tape and a physical tape label.

The virtual tapes that are presented to, selected by, managed by, or inventoried by the data protection application are preferably classified using the above mentioned "virtual barcodes." The virtual barcodes are implemented and presented by the virtual tape and/or the virtual tape library in exactly the same way as a physical tape library incorporates physical barcode labels. This allows the system 10 to select virtual barcodes that will match the physical data storage devices 20 that the data may eventually be copied to.

When a physical data storage device 20 is exported, it will preferably be in the native format in which it was written by the data protection application, and will also have a physical label or barcode that matches the virtual barcode that was assigned by
+the data protection application. Thus, the physical data storage device 20 that is created and exported by the system 10 is identical to that which would have been created had the device been created using a physical tape library.

Figure 2:
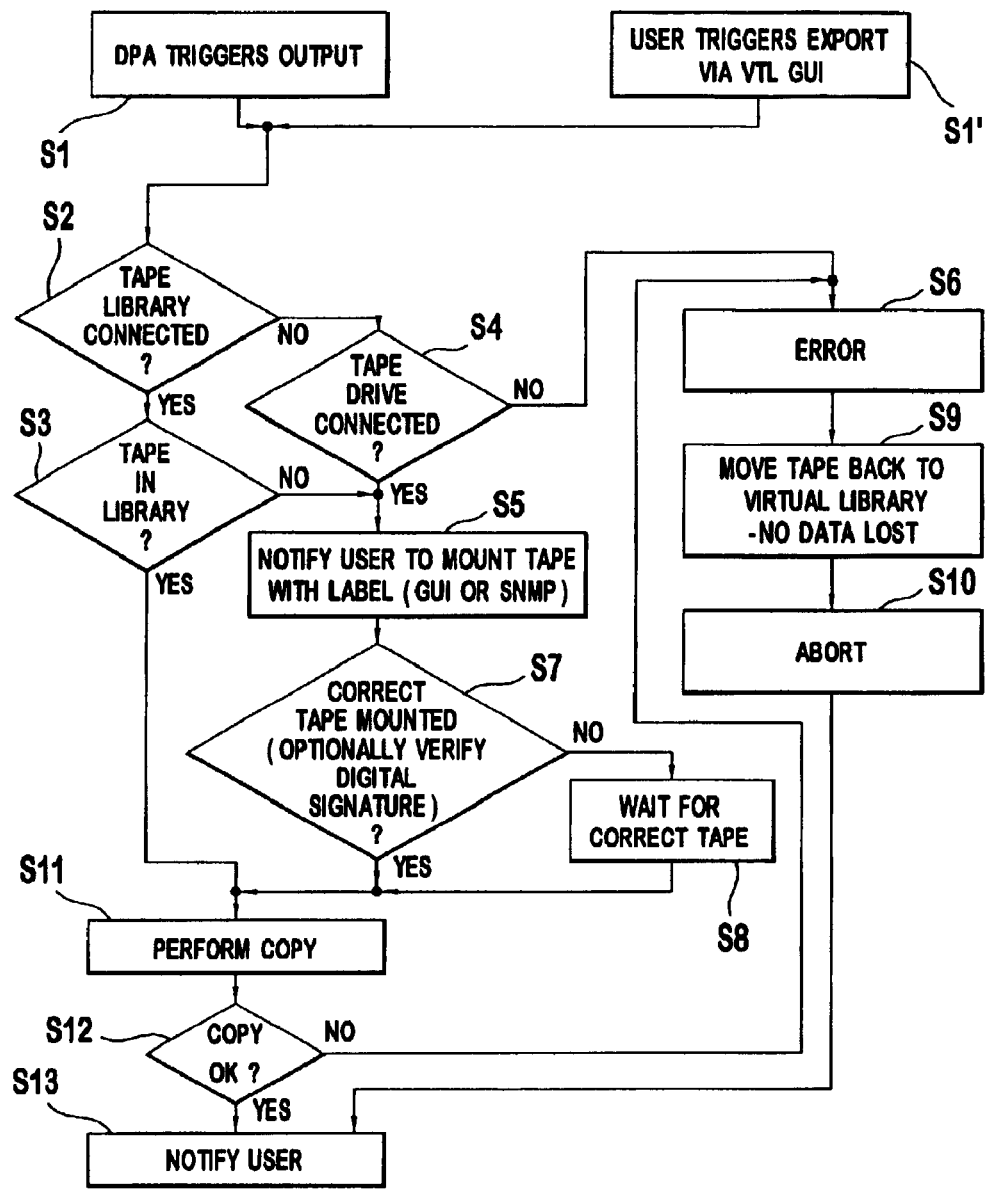
FIG. 2 is a schematic of a system for exporting a virtual tape from a virtual tape library according to the preferred embodiment of the present invention.
Figure 3:
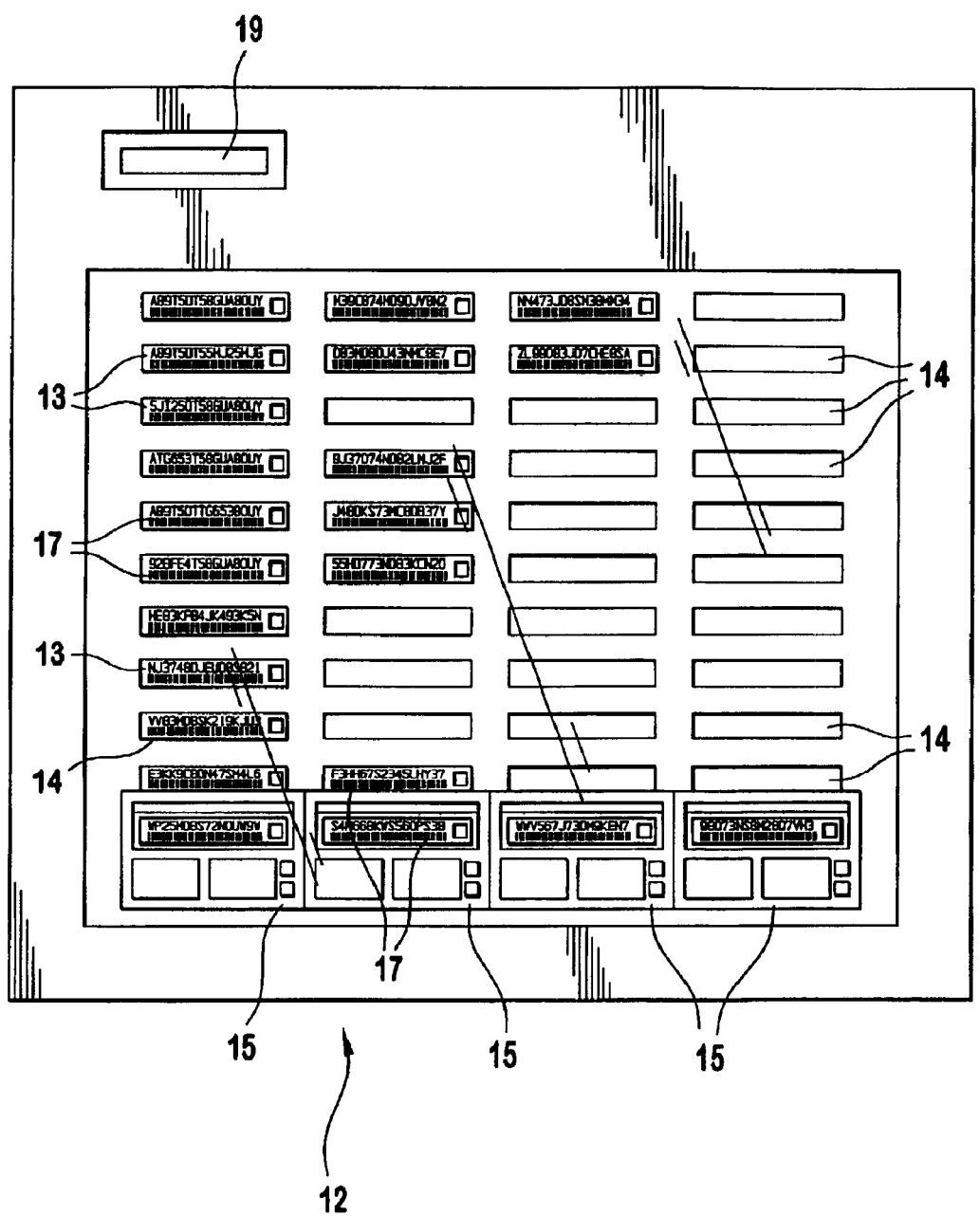
FIG. 3 is schematic of a typical physical tape backup library.

Referring to FIG. 2, when exporting virtual tapes, the data protection application (DPA) may play a central role in guiding the system 10 through the export process. The data protection application as part of its core function tracks the contents of all backup media using barcodes, serial numbers, or the like. Accordingly, the data protection application may be queried to determine which virtual tapes need to be exported. While the data protection application will provide the appropriate identifier for the physical tape that would need to be exported if the system 10 were not being used, that identifier can still be used by the system 10 to identify the appropriate virtual tape.

When a user manipulates the controls to a data protection application to input into the application particular tape(s) that are to be exported (or the data protection application does this automatically), the data protection application sends signals that would normally instruct the physical tape library to move the desired tapes into the entry/exit port of the physical tape library. The system controller 16 interprets these signals and operates the virtual library and/or virtual tapes to perform the equivalent functions. Alternatively, the command that triggers the virtual media export can directly from a user via a virtual library graphical user interface.

When the system 10 receives a signal representing a command to move a tape to an entry/exit port, the system 10 schedules creation of a physical data storage device 20. This initiates the system 10 workflow to commence. The system 10 flags the desired virtual tapes as a virtual export region. Virtual export regions can also be defined on the data storage medium 18. The virtual export regions provide locations for the placement of data prior that is to be copied to a physical data storage device 20. This allows the system 10 to mimic the behavior of an actual physical tape library to facilitate seamless integration between the system 10 and the data protection application.

The system also allows the user to specify (on a global basis, as a default, or on a tape by tape basis) what to do with the virtual tape once the physical copy of the tape has been created in the physical data storage device 20. The user can have the virtual tape deleted from the virtual tape library (as is the case when physical media is exported from a physical library). Alternatively, the virtual tape can be moved to a location within the virtual tape library but that does not appear to be within any of the libraries being emulated (thus, moving the tapes into a virtual vault). The virtual tape can also be left in the virtual tape library. Leaving a copy of an exported tape in the virtual tape library can be very useful when a user wants to send the physical tape off-site for protection and wants the virtual tape on-site and online in case it is required for a restore.

Once creation of a physical tape is scheduled by the data protection application or by the user, the process of creation will depend upon whether there is a physical tape library (or other suitable device for recording to the physical data storage device 20) connected to the virtual tape library with the correct physical tape available (or other physical data storage device). If the correct device for recording information and the correct physical data storage device are already connected to the virtual tape library, then the process is automated.

Otherwise, manual intervention by a user may be necessary to export a physical copy of the virtual tape. As will be described below, the system 10 of the present invention may use virtual barcodes or the like to ensure that the correct data is copied to the physical data storage device 20.

In general, if manual intervention is required, the user is notified by the virtual library to locate a tape (or other media) with the correct label (if the physical tape already exists) or else the user is notified to place the correct identifier label (such as a barcode label or the like) on a blank tape. The user is then notified to place this tape in an available physical tape drive (or other device). The virtual tape library then manages the copying of the contents of the virtual tape to the physical tape (or other suitable physical data storage device 20) in its entirety while preferably preserving the tape's native format. Thus, the method and system 10 of the present invention allows improved off-site data protection by utilizing removable physical data storage devices 20 as a secondary storage medium to export virtual tapes from a virtual tape library. It is preferred that the physical data storage device be any one of a physical tape, a disk, a removable drive, or the like.

In addition to the above mentioned advantages of the system 10 of the present invention, the system 10 also provides those advantages normally attributed to virtual tape libraries. Namely, that one or more virtual tape libraries that can be accessed by one or more servers 22A–22C. With respect to the signals sent and received from the servers, a virtual tape library emulates a physical tape library in a seamless fashion. However, the virtual tape library is faster, more reliable, and easier to manage.

Additionally, the system 10 can provide multiple virtual devices, library sharing between multiple servers 22A, 22B, or 22C or the like does not present logistical problems. Each server on a network can address its own virtual library without the need for load balancing and tuning. By eliminating reliance on physical tape for data storage, the system 10 eliminates many of the associated problems and, accordingly, is more powerful, higher performing, more reliable, and significantly easier to manage than a traditional tape backup library system. Due to the seamless integrability between the system 10 of the present invention and a pre-existing data protection application, a preexisting data protection application can be used with the system 10 of the present invention without modifying the application. This is possible even when the application was designed specifically for use with a physical tape library.

The system 10 is capable of producing physical data storage devices 20 that are identical to the virtual tapes that the preexisting data protection application intended to create by sending commands to write data to a physical tape library. The system 10 can create physical tapes (or other suitable physical data storage devices 20) with increased accuracy due to the optional use of virtual barcodes and a cross-checking procedure that can be implemented prior to copying. The virtual tapes that are utilized by the data protection application are preferably categorized using "virtual barcodes." The virtual barcodes are stored in and implemented with the virtual tape library in generally the same way as would be used in a physical tape library. The virtual barcodes are selected to be compatible with the physical data storage device 20 to which the data will eventually be copied. When virtual tapes are exported by the system 10 to physical data storage devices 20 that are recycled (i.e., written over) in a cyclical manner, it is preferable that each physical data storage device 20 have a digital signature. This digital signature is also preferably stored on one of the data storage medium 18, the virtual library, and the virtual tape. This allows the system 10 to compare the prerecorded digital signature with the digital signature of the physical data storage device 20 prior to copying data onto the device 20. This digital signature matching process prevents the accidental recording of data onto the incorrect physical data storage device 20.

The system 10 preferably presents a user with a user interface (described in further detail below) styled for manipulating a virtual tape backup library in a manner similar to that used to control a physical tape library. The virtual tape library provided by the system performs the data storage and retrieval functions requested by the user via the user interface.

The system 10 is preferably operated using the user interface, or graphical user interface (GUI). Those of ordinary skill in the art will appreciate from this disclosure that the user interface can be a keypad or the like without departing from the scope of the present invention. The user interface can be displayed on a monitor attached to one of the servers that backs up data to the system 10. Alternatively, the user interface can be located on the Internet for access by a remote controller. This allows the controller to easily manage a number of systems 10 from remote locations. The user interface preferably includes a number of user selectable fields. The user selectable fields can be clickable icons, touch sensitive icons, voice activated subroutines, activated by depressing certain key combinations on a keyboard, or the like. In addition to manipulating the system 10 using the user selectable fields, data can be moved using drag and drop operations in combination with any one of a touch screen, digital pen, track ball, touch pad, and mouse. The use of barcodes (described below) allows a user to manage data via the user interface by selecting data associated with particular barcodes.

As detailed above, the system 10 is preferably able to replace physical tape libraries with virtual tape libraries while allowing library operators to still use the same physical tape library controls that they are already trained to use. This system 10 accomplishes this by converting a controller 16 and data storage medium 18 into a disk-based appliance that is preferably a plug and play alternative to one or more physical tape libraries. Accordingly, the system 10 of the present invention is preferably usable with any preexisting data protection application that uses physical tape back up. In addition, the system 10 can include a user interface that allows the system 10 to be used as its own standalone data protection application or as a library cache for a physical tape library.

When the system 10 writes data onto one of the physical data storage devices 20, the data will preferably be written in the native format used by the data protection application. It is also preferable that a physical label or barcode will be placed on the physical data storage device 20 that matches the virtual barcode that is correlated with the virtual tape or the virtual tape library.

When storing data on physical data storage devices 20 from the virtual tapes, the system 10 is designed to be seamless when viewed by the data protection application. Accordingly, the system 10 preferably mimics the work flow pattern used by physical tape libraries (specifically shown in FIG. 1). Those of ordinary skill in the art will appreciate from this disclosure that the system 10 can be used with its own data protection software and, thus, avoid having to follow the work flow pattern of typical physical tape backup systems.

To copy data from a virtual library and/or a virtual tape to a physical data storage device 20, communication is established between the system 10 and the device 20. Then at least a portion of the data contained in one of the virtual tape and/or the virtual library is transferred to the physical data storage device 20.

Referring specifically to FIG. 2, one embodiment of the method of exporting a virtual tape is as follows. The export process can be triggered during step S1 when the data protection application requests data from that a virtual tape be exported or can be initiated when a user triggers the export process via a virtual tape library graphical user interface in step S1'. After the export process has been triggered and either step S1 or step S1 prime, the system 10 determines whether a tape library is connected to the virtual tape library during step S2. If no tape library is connected, then the system 10 proceeds to step S4, in which the system it is determines whether a tape drive is connected. If no tape drive is connected, then the system 10 registers an error during step S6. Then, in step S9, the system 10 moves the virtual tape back to the virtual library and no data is lost. After the virtual tape is returned to the virtual library, the system 10 aborts the export process during step S10 and notifies a user during step S13.

If the system 10 determines that a tape drive is connected during step S4, then the user is notified that a tape needs to be mounted during step S5. Then in step S7, the system 10 determines whether the correct tape is mounted in the tape drive. As mentioned above, this can be determined using barcodes or the like. If an incorrect tape is mounted in the tape drive, then the system 10 waits for the correct tape to be mounted during step S8. Once the correct tape is mounted in the tape drive, the system 10 copies the desired data from the virtual tape onto the mounted physical tape during step S11.

If during step S2, the system determines that a tape library is connected, then the system checks whether a tape is mounted in the library during step S3. If no tape is detected in the library, then the system 10 advances to step S5 and proceeds as detailed above. If during step S3, the system 10 determines that a tape is in the library, then the system 10 proceeds to step S11 and copies the desired data from the virtual data onto the physical tape. Optionally, the virtual library and/or the virtual tape can maintain a copy of the data transferred to the physical tape which results in the transferred data being "cloned." This feature can be selected on an individual transfer basis or triggered to operate as a global default. Additionally, data maintained on a virtual tape and/or a virtual library can be set to be "cloned" prior to writing to the virtual library or virtual tape if desired.

After the system has copied the desired data, the system 10 determines whether the copy is accurate during step S12. If during step S12, the system determines that the copy is inaccurate or that too much data has been copied, the system proceeds to step S6 and registers an error. After an error is registered in step S6, the system 10 proceeds as detailed above. If during step S12, the system determines that a copy was accurately made, then the system notifies the user during step S13 that the appropriate data has been exported from the virtual tape library. While FIG. 2 details one method of exporting data from a virtual tape library, those of ordinary skill in the art will appreciate from this disclosure that the method shown in FIG. 2 can be varied within the scope of the appended claims or the above description without departing from the scope of the present invention.

It is further recognized by those skilled in the art, that changes may be made to the above-described embodiments of the present invention without departing from the broad inventive concept thereof. It is understood, therefore, that this invention is not limited to the particular embodiments disclosed, but is intended to cover all modifications which are within the spirit and scope of the invention as defined by the appended claims.

What is claimed is:

1. A method of exporting a virtual tape from a virtual tape library that presents a user with a user interface styled for manipulating a virtual tape library in a manner similar to that used to manipulate a physical tape library in order to emulate a physical tape library so that the virtual tape library may generate a physical tape in a same way that the physical tape is generated in a physical tape library, the virtual tape library performing the data storage and retrieval functions so that the physical tape library can be enhanced by the virtual tape library functioning as a cache for the physical tape library or can be eliminated for primary backup operations, the method comprising:

providing the user interface having a plurality of user selectable fields styled like a physical tape library, the user interface sending signals to export virtual media in response to manipulation of one of the plurality of user selectable fields;

providing a control mechanism that can trigger the export of virtual media in response to signals from an external backup application;

providing a controller in communication with the user interface, the controller receiving the signals from the user interface;

providing a data storage medium in communication with the controller, the data storage medium having at least one virtual library defined thereon, each virtual library being capable of having a plurality of virtual tapes defined therein, the data storage medium being capable of storing a plurality of data in the at least one virtual library in response to signals received by the controller;

establishing communication between the data storage medium and a physical data storage device; and copying at least a portion of the plurality of data from at least one virtual tape to the physical data storage device, whereby a physical tape is generated in a same way that a physical tape is generated in a physical tape library.

2. The method of claim 1, further comprising the step of associating the physical data storage device with a bar code that corresponds to a virtual bar code associated with the virtual tape.

3. The method of claim 2, wherein the plurality of data is copied to the physical data storage device in a non-proprietary format.

4. The method of claim 1, further comprising copying a plurality of virtual tapes to the physical data storage device.

5. The method of claim 1, wherein the copying to the physical data storage device comprises copying to a physical tape.

6. The method of claim 1, wherein the copying to the physical data storage device comprises copying to a removable drive.

7. The method of claim 1, further comprising providing at least one graphical image on the user interface styled to represent physical tape bar codes, each graphical image corresponding to a virtual library and/or virtual tape.

8. The method of claim 7, further comprising selecting the virtual tape to export by selecting the appropriate virtual bar code via one of the plurality of user selectable fields.

9. The method of claim 1, further comprising providing a virtual export region defined on the data storage medium, the at least a portion of data from the at least one virtual tape being marked in the virtual export region prior to copying to the physical data storage device.

10. The method of claim 1, further comprising a user moving or copying the at least a portion of data from the at least one virtual tape using a drag and drop operation.

11. The method of claim 1, further comprising deleting the virtual tape to increase space in the virtual library.

12. The method of claim 1, further including verifying that a digital signature on the physical data storage device matches a prerecorded digital signature prior to copying the at least a portion of the plurality of data to the physical data storage device.

13. A system for exporting a virtual tape from a virtual tape library that presents a user with a user interface styled for manipulating a virtual tape library in a manner similar to that used to manipulate a physical tape library in order to emulate a physical tape library so that the virtual tape library generates a physical tape in a same way that the physical tape is generated in a physical tape library, the virtual tape library performing the data storage and retrieval functions requested by the user via the user interface so that the physical tape library can be eliminated for primary backup operations, the system comprising:

the user interface having a plurality of user selectable fields styled to interface with the physical tape library, the user interface being capable of sending signals in response to manipulation of one of the plurality of user selectable fields;

a controller in communication with the user interface, the controller receiving the signals from the user interface;

a data storage medium in communication with the controller, the data storage medium having at least one virtual library and/or virtual tape defined thereon, the data storage medium being capable of storing a plurality of data in the at least one virtual library and/or virtual tape in response to signals received by the controller; and a physical data storage device that is detachably able to be put in communication with the at least one virtual library and/or virtual tape to receive at least a portion of the plurality of data therefrom.

14. The system of claim 13, further comprising the at least one virtual library and/or virtual tape each having a virtual bar code.

15. The system of claim 13, wherein the physical data storage device comprises a physical tape.

16. The system of claim 13, wherein the physical data storage device comprises a removable drive.

17. The system of claim 13, wherein the user interface includes at least one graphical image styled to represent physical tape bar codes, each graphical image corresponding to a virtual library and/or a virtual tape.

18. The system of claim 17, wherein at least some of the plurality of user selectable fields correspond to a plurality of virtual bar codes.

19. The system of claim 13, further comprising a virtual export region defined on the data storage medium, the at least one portion of data from the at least one virtual tape being marked as the virtual export region.

20. A method of exporting a virtual tape from a virtual tape library that presents a user with a virtual library user interface having the appearance of an interface for a physical tape library in order to emulate a physical tape library so that the virtual tape library generates a physical tape in a same way that the physical tape is generated in a physical tape library, the virtual tape library performing the data storage and retrieval functions so that the physical tape library can be eliminated for primary backup operations, the method comprising:

providing the virtual library user interface having a plurality of user selectable fields styled like a physical tape library, the virtual library user interface sending signals to export virtual media in response to manipulation of one of the plurality of user selectable fields;

providing a controller in communication with the virtual library user interface and/or a pre-existing data protection application, the controller being capable of receiving the signals from the virtual library user interface and being capable of receiving and interpreting commands from the pre-existing data protection application;

copying at least a portion of the plurality of data from at least one virtual tape to a physical data storage device, whereby a physical tape is generated in a same way that a physical tape is generated in a physical tape library.

21. A system for exporting a virtual tape from a virtual tape library that presents a user with a virtual tape library user interface having the appearance of a physical tape library interface, the virtual tape library user interface manipulating a virtual tape library in a manner similar to that used to manipulate a physical tape library in order to emulate a physical tape library so that the virtual tape library generates a physical tape in a same way that the physical tape is generated in a physical tape library, the virtual tape library performing the data storage and retrieval functions requested by the user via the virtual tape library user interface so that the physical tape library can be eliminated for primary backup operations, the system comprising:

the virtual tape library user interface having a plurality of user selectable fields configured to have the appearance of a physical tape library user interface, the virtual tape library user interface being capable of sending signals in response to manipulation of one of the plurality of user selectable fields;

a controller in communication with the virtual tape library user interface, the controller receiving the signals from the virtual tape library user interface and/or a pre-existing data protection application; and a data storage medium in communication with the controller, the data storage medium having at least one virtual library and/or virtual tape defined thereon, the data storage medium being capable of storing a plurality of data in the at least one virtual library and/or virtual tape in response to signals received by the controller.

22. The system of claim 21, further comprising a physical data storage device that is detachably able to be put in communication with the at least one virtual library and/or virtual tape to receive at least a portion of the plurality of data therefrom.

23. A method of exporting a virtual tape from a virtual tape library that presents a user with a user interface styled for manipulating a virtual tape library in a manner similar to that used to manipulate a physical tape library in order to emulate a physical tape library so that the virtual tape library generates a physical tape in a same way that the physical tape is generated in a physical tape library, the method comprising:

triggering a signal representing a command to export data;

providing a controller that receives the signal;

providing a data storage medium in communication with the controller, the data storage medium having at least one virtual library defined thereon, each virtual library being capable of having a plurality of virtual tapes defined therein, the data storage medium being capable of storing a plurality of data in the at least one virtual library in response to signals received by the controller;

establishing communication between the data storage medium and a physical data storage device; and copying at least a portion of the plurality of data from at least one virtual tape to the physical data storage device, whereby the physical tape is generated in a same way that the physical tape is generated in a physical tape library.

24. The method of claim 23, wherein triggering the signal comprises manipulating the user interface having a plurality of user selectable fields styled like a physical tape library, the user interface sending the signal to export virtual media in response to manipulation of one of the plurality of user selectable fields.

25. The method of claim 24, wherein triggering the signal comprises an external backup application sending the signal to trigger the export of virtual media.

26. The method of claim 23, further comprising maintaining in the virtual tape library and/or the virtual tape a copy of the at least a portion of the plurality of data that is copied to the physical data storage device.

27. The method of claim 26, further comprising triggering the automatic maintaining of a copy in the virtual library and/or virtual tape of the at least a portion of the plurality of data whenever the at least a portion of plurality of data is transferred between the physical data storage device and the virtual library and/or the virtual tape.

* * * * *